US007680033B1

(12) United States Patent
Khan et al.

(10) Patent No.: US 7,680,033 B1
(45) Date of Patent: Mar. 16, 2010

(54) NETWORK MANAGER CIRCUIT REDISCOVERY AND REPAIR

(75) Inventors: Tanveer A. Khan, San Jose, CA (US); Mahesh Subramanian, San Jose, CA (US)

(73) Assignee: Ciena Corporation, Linthicum, MD (US)

( * ) Notice: Subject to any disclaimer, the term of this patent is extended or adjusted under 35 U.S.C. 154(b) by 1349 days.

(21) Appl. No.: 10/768,139

(22) Filed: Feb. 2, 2004

Related U.S. Application Data

(60) Provisional application No. 60/512,185, filed on Oct. 20, 2003.

(51) Int. Cl.
*H04L 12/08* (2006.01)

(52) U.S. Cl. ...................................... 370/225; 370/498

(58) Field of Classification Search ................. 370/222, 370/254, 294, 431, 905, 907, 351, 355, 385, 370/468, 442, 458, 498, 225; 359/124
See application file for complete search history.

(56) References Cited

U.S. PATENT DOCUMENTS 3,956,593 A * 5/1976 Collins et al. ............... 370/371
5,351,232 A * 9/1994 Yamashita .................. 370/248
5,974,459 A * 10/1999 Chattopadhyay et al. .... 709/224
6,580,689 B1 * 6/2003 Nagai et al. ................ 370/227
6,782,000 B2 * 8/2004 Subramanian et al. ...... 370/458
7,168,044 B1 * 1/2007 Mao .......................... 715/736
7,224,706 B2 * 5/2007 Loeffler-Lejeune ......... 370/508

* cited by examiner

*Primary Examiner*—Kevin C Harper
*Assistant Examiner*—Henry Baron
(74) *Attorney, Agent, or Firm*—Clements Bernard PLLC; Christopher L. Bernard; Tyler S. Brown

(57) ABSTRACT

The present invention provides a way to discover/rediscover or repair a path in a SONET network using a "bottom-up" approach. In particular, information from nodes in the network is retrieved. The information indicates whether a node in the network cross-connects or adds/drops information in each of the timeslot of a SONET frame. A timeslot that is configured as an add/drop is considered a boundary of the path. Accordingly, based on the timeslots that are configured as boundaries, a path may be discovered/rediscovered or repaired.

30 Claims, 8 Drawing Sheets

Receive request
400

Search for first boundary
402

Boundary found?
404

No

Yes

Search for second boundary
406

Second boundary found?
408

No

Yes

Build/Update path object
410

NETWORK MANAGER CIRCUIT REDISCOVERY AND REPAIR

This Nonprovisional application claims priority under 35 U.S.C. § 119(e) on U.S. Provisional Application No(s). 60/512,185 filed on Oct. 20, 2003, the entire contents of which are hereby incorporated by reference.

FIELD OF THE INVENTION

This invention relates generally to networks and communications, and more specifically, to rediscovery and repair of communications in an optical network.

BACKGROUND OF THE INVENTION

Today, a telecommunications network can carry data at extremely high speeds, such as up to 10 Gigabits/second, using optical network technology. A widely adopted optical network technology is Synchronous Optical Network/Synchronous Digital Hierarchy ("SONET/SDH") technology. SONET/SDH technology uses optical fibers and nodes, such as Add-Drop Multiplexers ("ADMs") and Digital Cross-Connects ("DCS"), to carry data. International and North American standard bodies have defined various SONET/SDH configurations for the operation of optical networks.

Typically, SONET/SDH devices are managed in a top-down manner by a centralized management system. In a centralized management system, topology definition and circuit assignments are controlled by a server and database. For example, the server calculates routes through a network of SONET/SDH devices and provisions circuits in the network based on the calculated routes. The database stores the information that tracks the routes and provisioned circuits. The information is typically entered manually, for example, by an administrator and must be updated on a continual basis.

Unfortunately, known management systems suffer from several problems. The information in the management system database often becomes out of sync with actual conditions in the network. This is because devices in the network are continually being changed, such as for maintenance, or installation of new equipment. For example, a new interface card may be installed in an existing node or a node may be taken down for maintenance. In addition, various failures may occur in the network, such as an equipment failure or cut in the optical fiber, which causes the configuration of the network to change. However, known management systems require time to incorporate any of these changes into the database.

In addition, the network management database may become corrupted. For example, one or more files in the database may have one or more errors when being stored, or one or more files in the database may be inadvertently deleted. In these instances, the network management system may lose all or part of its information on the topology and provisioning of the network.

These problems cause known network management systems for SONET/SDH networks to be difficult to manage and slow to react to changes in network conditions. Accordingly, it would be desirable to provide a network management system that is capable of efficiently reacting to network changes, such as during a failure or maintenance. In addition, it would be desirable to provide a network management system that is capable of efficiently collecting information on the topology and provisioning of a network.

SUMMARY

In accordance with one feature of the invention, a path that has been provisioned in a communications network is identified. The network has a plurality of nodes that are connected to each other through links that carry time division multiplexed signals divided into a set of predetermined timeslots. A request is received to identify a path that has been provisioned in the network. Information is retrieved from nodes in the network that indicate a respective configuration of the predetermined timeslots. At least one pair of boundaries of the path is then identified based on the configurations of the predetermined timeslots.

In accordance with another feature of the present invention, a system identifies a path that has been provisioned in a communications network. The network has a plurality of nodes that are connected to each other through links that carry signals divided into a set of predetermined timeslots. A memory stores information indicating paths that have been provisioned in the network. An interface is used to retrieve information that indicates a respective configuration of the predetermined timeslots from the nodes in the network. A processor configured by program code then identifies at least one pair of boundaries of a selected path based on the configuration of the predetermined timeslots of the nodes in the network and updates the information for the selected path that is stored in the memory.

In accordance with another aspect of the present invention, a repair for a path that has been provisioned in a communications network is identified. The network has a plurality of nodes that are connected to each other through links that carry signals divided into a set of predetermined timeslots. A request to repair a path that has been provisioned in the network is received. Information is retrieved from nodes in the network that indicate a respective configuration of the predetermined timeslots. A first boundary of the path is identified based on the configurations of the predetermined timeslots. The path is then traced from the first boundary through nodes in the network based on the configurations of the predetermined timeslots. It is then determined whether the path ends at a second boundary based on the configurations of the predetermined timeslots.

Additional features of the invention will be set forth in part in the description which follows, and in part will be obvious from the description, or may be learned by practice of the invention. The features of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE EMBODIMENTS

Figure 1:
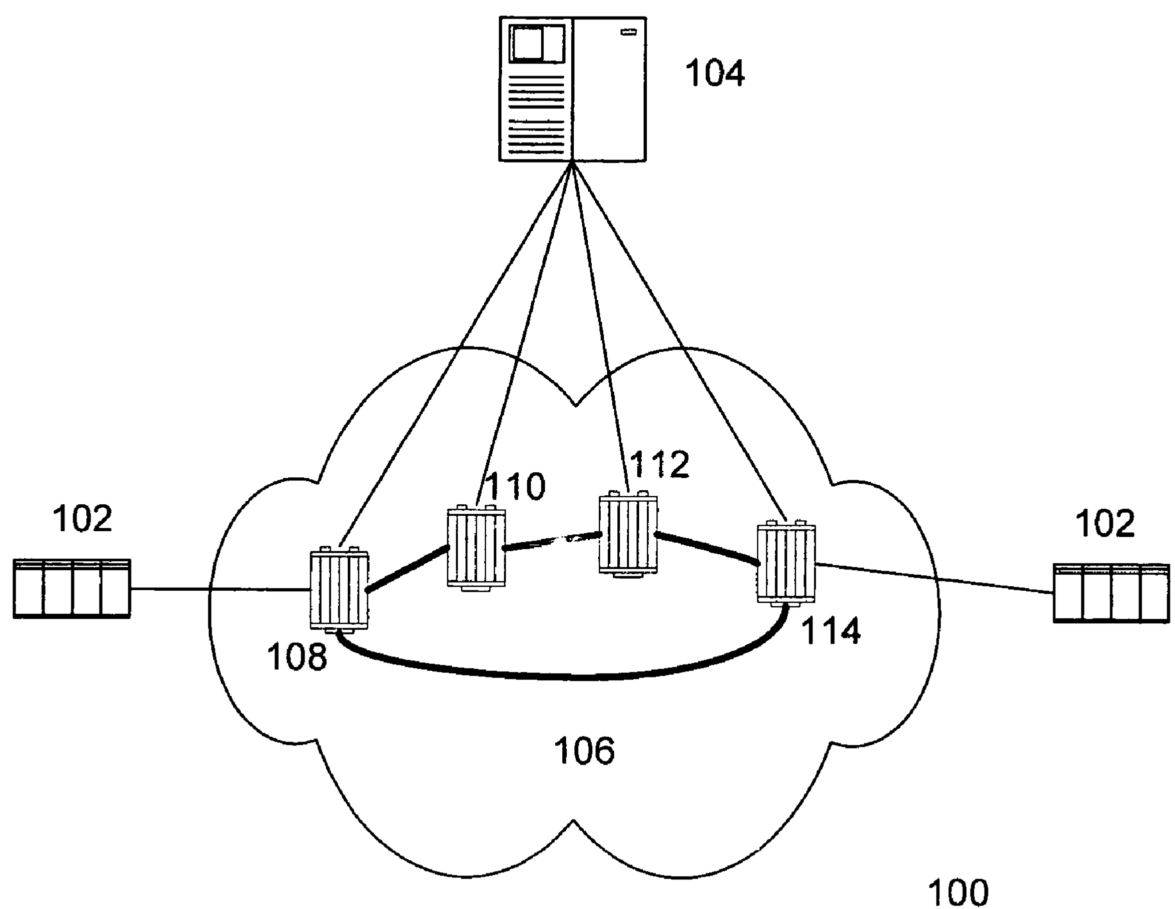
FIG. 1 shows a system that is consistent with the principles of the present invention.

The features of the present invention allow for the repair and rediscovery of one or more circuits in a network and for the rediscovery of circuits having missing elements. For example, the present invention may be useful in SONET networks that comprise one or more rings of nodes.

According to one feature of the present invention, a single circuit or route in a SONET network may be traced and re-provisioned based on a starting timeslot and existing cross-connects. A list of nodes is retrieved and ports on these nodes having cross-connects are then discovered, for example, based on one or more user selections. The list of nodes that are participating in the circuit either on a working or protect route is determined. Starting from a particular timeslot, a search is then conducted for available add-drop cross-connects in the network. For each add-drop cross-connect, the same timeslot on each node is analyzed to determine whether an add-drop or pass-through cross-connect has been provisioned. If the timeslot on the node is configured as a pass-through cross-connect, then processing continues to the next node participating in the circuit. If the same timeslot on the node is configured as an add-drop cross-connect, then it is determined whether processing has cycled through the network back to the same node. For example, processing may stop when a matching add-drop cross connect is found or if processing reaches the node at which processing started, whichever is earlier. If no boundary, e.g., an add-drop cross-connect, is found and processing has fully traversed the network, then no circuit was discovered and an error may be reported to the user. Otherwise, the circuit is considered fully discovered.

According to another feature of the present invention, multiple circuits in a SONET network may be repaired or rediscovered. In particular, a list of rings in the network is retrieved. For each ring, a list of nodes is then determined. For each node, a map is created that lists cross-connects for each timeslot of communications through the node. These maps may have entries for timeslots that have cross-connects and may ignore those timeslots that do not have cross-connects. The map may be based on a hashing function. Processing may then start at a first node in the network and proceed in a given direction, such as "east" or right. At each node, the map for that node is analyzed to identify cross-connects that are configured along a side of that node. For each add-drop cross connect that is found, processing proceeds to the next node on the same timeslot. If a pass-through cross-connect is found on the timeslot, then processing proceeds to the next node. If an add-drop cross-connect is found on the timeslot, then processing may stop for a particular circuit. If neither is found, then processing may indicate an error in the circuit.

The present invention may also account for various protection schemes. For example, if a circuit in the SONET network uses a "1+1" protection scheme or similar, then the nodes in the network may be searched in multiple directions. Furthermore, as cross-connects are found, they may be flagged to avoid repetitive processing.

In accordance with yet another feature of the present invention, missing elements of a circuit may be rediscovered. For example, a route in a SONET network may be searched or traced based on a starting timeslot and existing cross-connects. Missing cross-connects may then be identified based on this search through the network. The searches may be conducted in one direction through the network. For example, the node in which there is a missing cross-connect may be identified based on the search. Multiple converging searches may also be performed to find and fix a missing cross-connect.

In addition, the present invention may account for the use of timeslot interchange ("TSI") in the network. In such an instance, the search may be conducted in multiple directions through the network. For the nodes that are missing cross-connects, the timeslot in which a cross-connect should be configured may be identified and the node reconfigured to complete a particular circuit. Alternatively, timeslots that have cross-connects for circuits that are complete may be flagged so that they are not used for an incomplete circuit.

Reference will now be made in detail to the present embodiments of the invention, examples of which are illustrated in the accompanying drawings. Wherever possible, the same reference numbers will be used throughout the drawings to refer to the same or like parts.

FIG. 1 shows a system 100 that is consistent with the principles of the present invention. As shown, system 100 may comprise one or more terminal devices 102, an element management server ("EMS") 104, and a network 106. Network 106 may further comprise a set of nodes, such as nodes 108, 110, and 112. The interconnection of these components will now be discussed.

Terminal devices 102 may be coupled to network 106 using known types of links. For example, terminal devices 102 may be coupled to network 106 using a fiber optic link, wireline link, or wireless link. In addition, terminal devices 102 may communicate with network 106 and each other using a variety of protocols, such as SONET, Ethernet, Frame Relay, Asynchronous Transfer Mode ("ATM"), or Internet Protocol ("IP"). Furthermore, terminal devices 102 may be coupled to one or more other networks (not shown).

EMS 104 may be coupled to network 106 using known types of links. For example, EMS 104 may be coupled to one or more of nodes 108, 110, or 112 via an Ethernet link, an IP link, or through a channel of a fiber optic link. In particular, EMS 104 may be coupled to an Ethernet port of nodes 108, 110, and 110. Alternatively, EMS 104 may be coupled directly to one of the nodes in network 106, such as node 108. EMS 104 may then be indirectly connected to the other nodes via channels in network 106, such as a SONET channel.

Network 106 may include one or more networks in which a plurality of nodes are interconnected to each other. For example, as shown in FIG. 1, nodes 108, 110, and 112 may be connected together in a ring. For ease of discussion, from the point of view of the ring overall, information may travel between nodes 108, 110, and 112 in either clockwise or counterclockwise directions, In addition, from a node's point of view, the two directions may be arbitrarily designated east and west, or upstream and downstream. Although FIG. 1 shows a ring network, network 106 may include other types of configurations, such as nodes connected together in a linear fashion or in a mesh, wherein a plurality of nodes are directly connected to other nodes.

Nodes 108, 110, and 112 may be coupled together using one or more sets of optical links or "spans" to form an optical network. The optical fiber links used in network 106 may be either single-wavelength or multi-wavelength. Nodes 108, 110, and 112 may transmit many signals on the optical fiber at the same time using known techniques, such as wavelength division multiplexing ("WDM") or dense wavelength division multiplexing ("DWDM"). Common wavelengths for use in fiber-optic transmission include wavelengths in the neighborhoods of 1310 nm and 1550 nm. The optical fiber used to connect nodes 108, 110, and 112 may be single-mode or multi-mode.

In the discussion that follows, nodes 108, 110, and 112 are configured as a SONET-type network. That is, nodes 108, 110, and 112 communicate with each other based on a SONET frame. The SONET frame uses time division multiplexing (TDM) carry multiple channels of information. In particular, each channel of information is given one or more timeslots within the frame. However, nodes 108, 110, and 112 and network 106 may carry data in other forms, such as ATM cells, IP packets, or other types of packet or synchronous data. The components of system 100, i.e., terminal devices 102, EMS 104, and nodes 108, 110, and 112, will now be further described.

Terminal devices 102 may serve as a source/recipient of information that is carried by system 100. For example, terminal devices 102 may be a computer, a server, a router, a switch, or other type of network node. Terminal devices 102 may be implemented using known types of equipment, such as customer premises equipment ("CPE"). In addition, as noted above, terminal devices 102 may be connected to another network (not shown). Although FIG. 1 depicts two terminal devices 102, system 100 may comprise any number of terminals devices.

EMS 104 provides a structure and platform for storing and managing the configuration of network 106. EMS 104 receives information about the topology and configuration of each the nodes in network 106, such as nodes 108, 110, and 112. EMS 104 also provisions nodes in network 106 and calculates paths in network 106.

EMS 104 may be implemented using a variety of devices and software. For example, EMS 104 may be a computer or processor that runs one or more application programs and stored procedures under an operating system, such as Linux, UNIX, or Windows. In addition, EMS 104 may include a database management system, such as a relational database management system, to manage the information related to the configuration and provisioning of network 106. For example, paths configured in network 106 may be stored as a path object in this database. The specific data structure of a path object may be according to a variety of formats, which are known to those of ordinary skill in the art. EMS 104 is also described with reference to FIG. 2.

Nodes 108, 110, and 112 serve as nodes of network 106 for carrying information, such as information between terminal devices 102. Each node may include an add-drop multiplexer ("ADM") that interfaces optical fibers to other devices that are to communicate with each other over network 106. Alternatively, nodes 108, 110, and 112 may be configured as other types of SONET devices, such as a digital cross connect.

As an ADM, nodes 108, 110, and 112 may provide two broad functions. The first function is extracting information in one of the timeslots from a received SONET frame and passing that information into a timeslot of a transmitted SONET frame (along with the information in the other timeslots). The second function is rerouting information, if needed, onto backup optical fibers ("protection fibers") in the event of a failure in one or more of the "working" fiber optic links. One example of nodes 108, 110, and 112 is also described with reference to FIGS. 3A and 3B.

Figure 2:
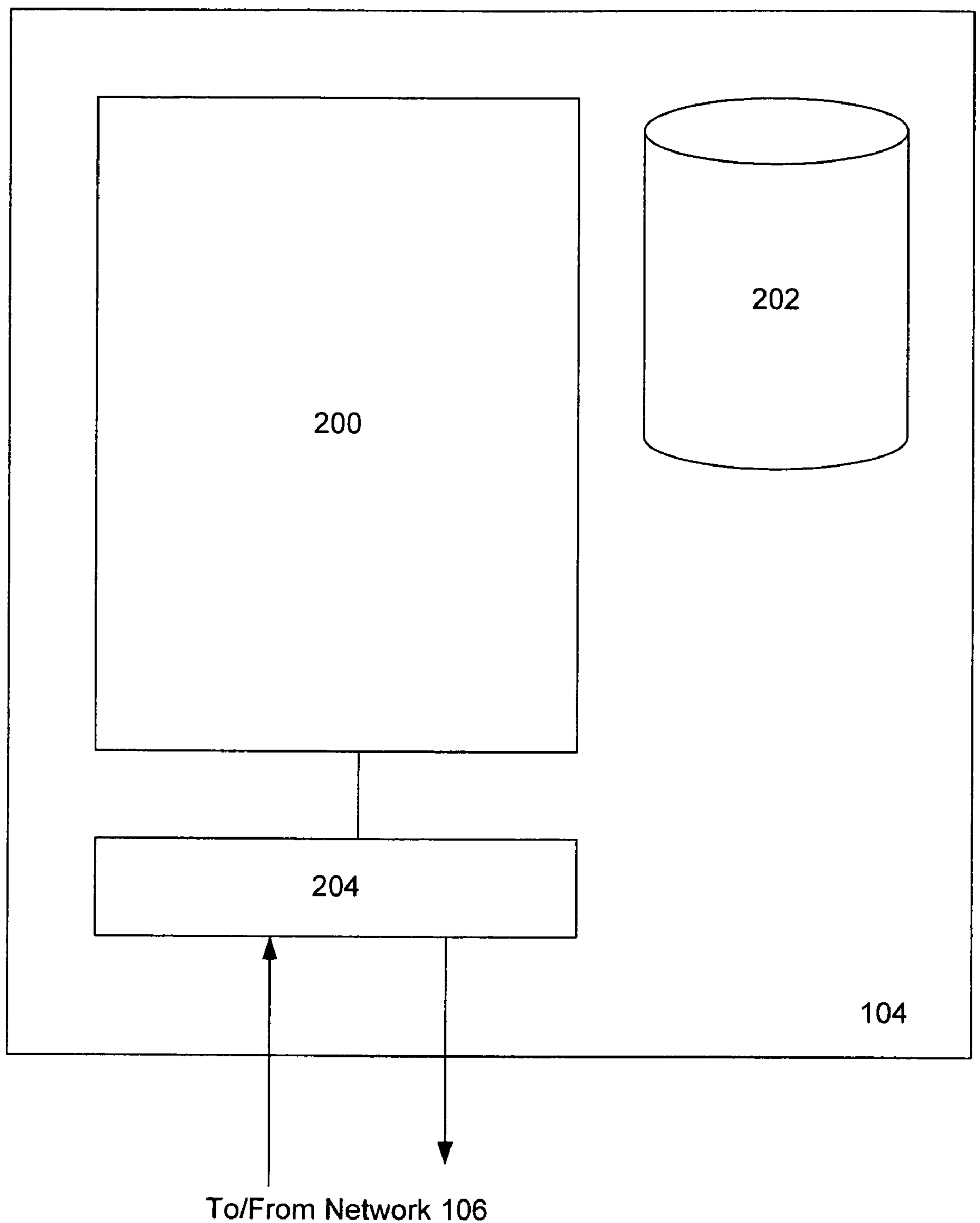
FIG. 2 illustrates a conceptual diagram of an element management server in accordance with the principles of the present invention.

FIG. 2 illustrates a conceptual diagram of EMS 104 in accordance with the principles of the present invention. As shown, EMS 104 may comprise a network management application 200, a network configuration database 202, and a communications module 204.

Network management application 200 is program code that implements the functions and procedures of EMS 104. Network management application 200 may be written in a variety of host programming languages, such as C, C++, Java, or COBOL.

Network configuration database 202 stores information that models the topology and provisioning of network 106. For example, paths configured in network 106 may be modeled by a path object, which indicates the nodes that are part of the path. In addition, a path object may include other information about a path, such as its bandwidth, protection scheme, and protection path in the event of a failure. Network configuration database 202 may be implemented using a variety of devices and software. For example, network configuration database 202 may be implemented as a relational database or object-oriented database. In addition, network configuration database 202 may use a variety of types of storage, such as tape drive, optical storage units, or magnetic disk drive.

Communications module 204 serves as a communication interface for EMS 104. For example, communications module 204 may communicate with nodes 108, 110, and 112 to collect information about the topology and provisioning of network 106. In one embodiment, nodes 108, 110, and 112 pass IP packets to communications module 204 that contain information encoded as extensible markup language ("XML") name-value pairs. Of course, communications module 204 may communicate with any component of system 100 and use any communications protocol, such as simple network management protocol ("SNMP"), resource reservation protocol ("RSVP"), Q.931/Q.2931, and optical signaling routing protocol ("OSRP").

Figure 3A:
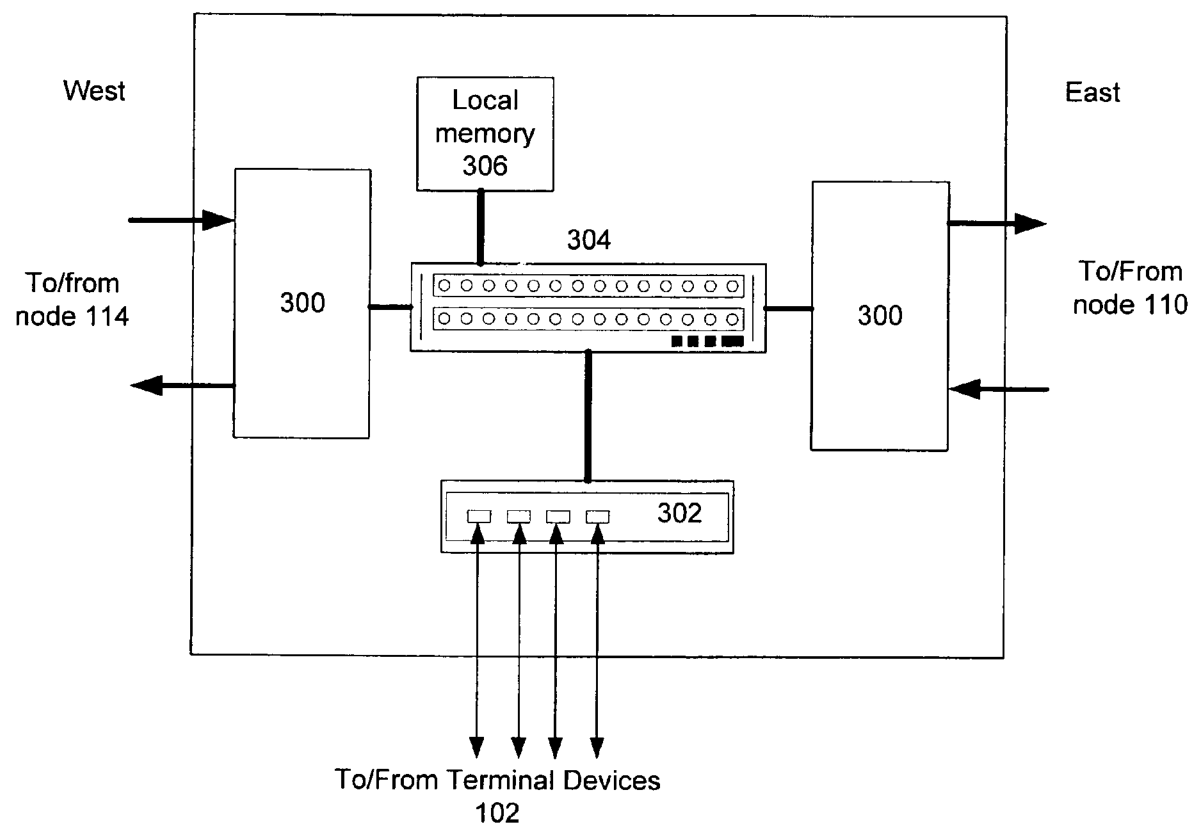
FIG. 3A illustrates a node that may be used in accordance with the principles of the present invention.

FIG. 3A illustrates a node that may be used in accordance with the principles of the present invention. In particular, for purposes of illustration, FIG. 3A illustrates the general architecture of node 108. As shown, node 108 may include high speed interfaces 300, an add/drop interface, an add/drop multiplexer 304, and a local memory 306.

High speed interfaces 300 couples node 108 with other nodes in network 106, i.e., nodes 110 and 112. For example, high speed interfaces 300 may be configured as SONET interfaces that operate at synchronous transport signal ("STS") 1/3, or optical carrier ("OC-N") data rates. High speed interfaces 300 may be implemented using known types of SONET/SDH equipment. For example, high speed interfaces 300 may include components that are capable of driving an optical signal or lightwave through an optical fiber. In general, the present invention may be used with SONET equipment as well as SDH equipment. Therefore, various embodiments of the present invention may employ SONET equipment, SDH equipment, or SONET/SDH equipment.

Low speed interface 302 couples node 108 and allows network 108 to add or drop lower speed signals into network 106. For example, low speed interface 302 may pass bit or byte synchronous traffic or asynchronous traffic onto the SONET links connected to node 108. Low speed interface 302 may be implemented using known circuitry and components. For example, low speed interface 302 may include circuitry to drive an electrical signal over a copper wire.

Add/drop multiplexer 304 passes data between high speed interfaces 300. In addition, add/drop multiplexer 304 may add/drop data within the data between high speed interfaces 300. For example, add/drop multiplexer 304 may be a fully synchronous byte-oriented multiplexer that is capable of adding or dropping a low speed digital signal ("DS-N") within the OC-N signal carried by high speed interfaces 300. Add/drop multiplexer 304 may operate bi-directionally and component terminations, i.e., by terminal devices 102, may occur in either direction. The low speed DS-N signal may then be passed to another node or to a device coupled to network 106, such as terminal devices 102.

Add/drop multiplexer 304 may include protection switching capabilities to switch data signals between different optical fibers, such as between "working" and "protect" optical fibers. Furthermore, add/drop multiplexer 304 may include time-slot interchangers to allow cross connection between channels of an OC-N signal.

Local memory 306 stores information that is used by node 108. For example, local memory 306 may include information, such as a routing table, that indicates one or more paths provisioned through node 108. Local memory 306 may also include information for back-up purposes, such as facility maintenance capabilities. Local memory 306 may be implemented using various types of devices, such as a non-volatile memory device.

Figure 3B:
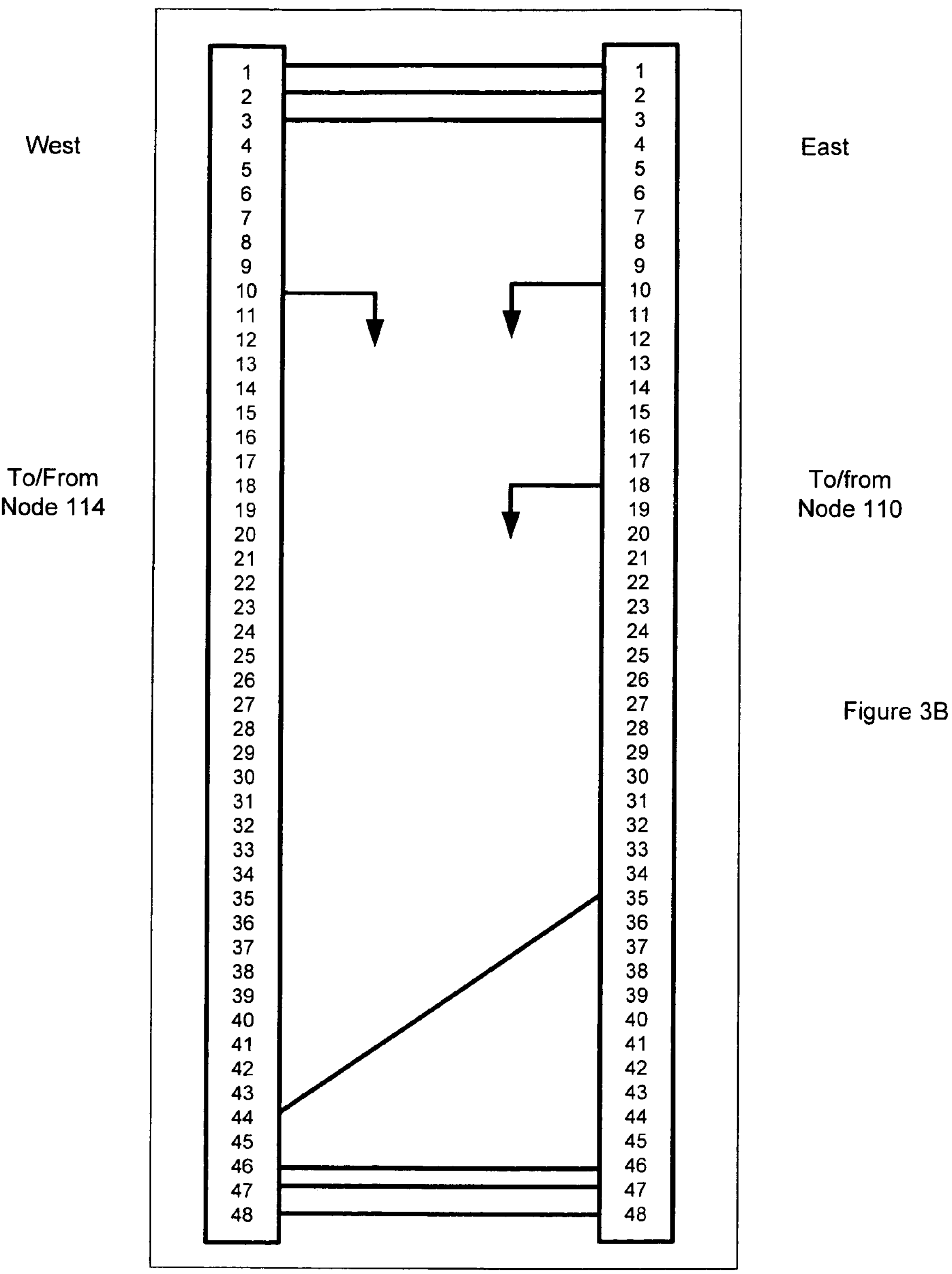
FIG. 3B illustrates a conceptual diagram of a node that may be used in accordance with the principles of the present invention.

FIG. 3B illustrates a conceptual diagram of a node that may be used in accordance with the principles of the present invention. For purposes of illustration, node 108 is shown as passing data in either a "west" or "east" direction. As shown, node 108 is shown carrying STS frames having N channels or timeslots, i.e., 48 channels, on an OC-N signal. As shown, node 108 may pass through data on a particular channel or timeslot, such as data on timeslots 46-48. Node 108 may support TSI to allow the interchange of data between channels or timeslots, such as between timeslot 44 on the west side and timeslot 34 on the east side. Node 108 may also add/drop data, such as in timeslot 10.

Figure 4:
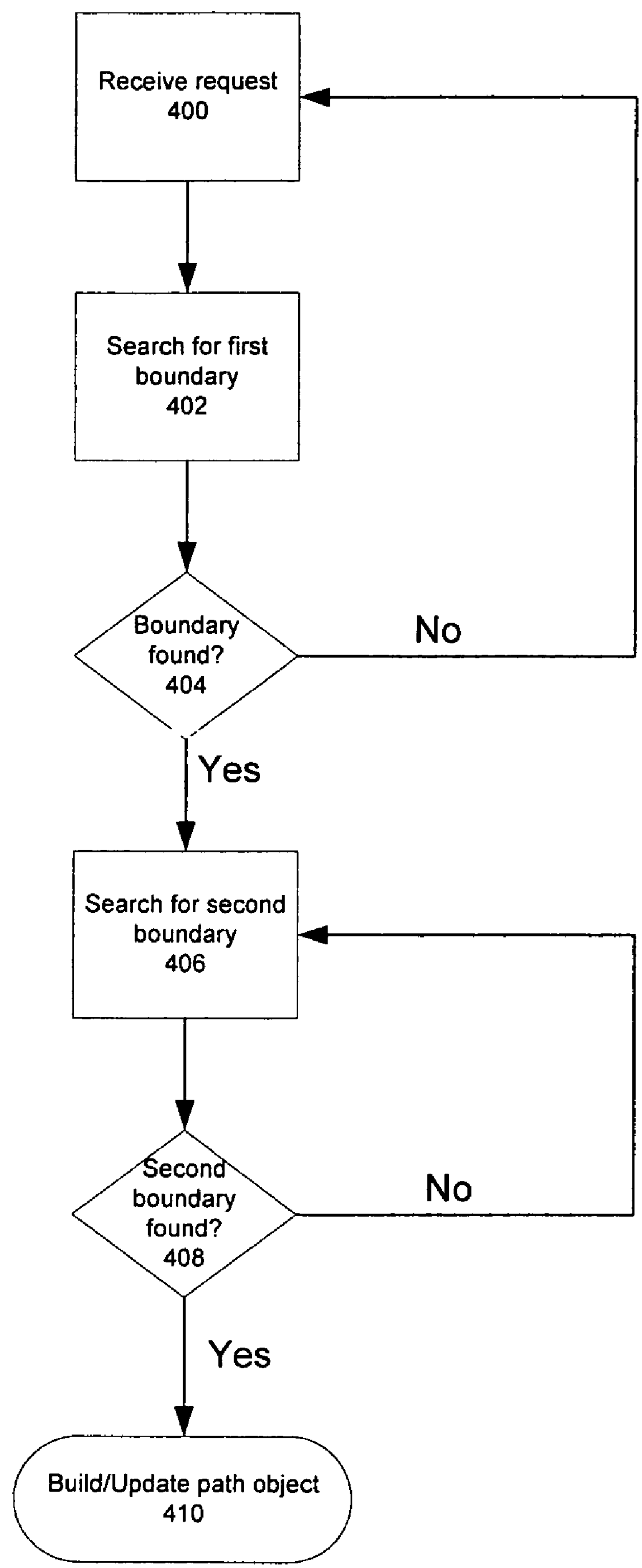
FIG. 4 illustrates an exemplary process flow to discover/rediscover a path in the network in accordance with the principles of the present invention.

FIG. 4 illustrates an exemplary process flow to discover/rediscover a path in the network in accordance with the principles of the present invention. In stage 400, a request to discover/rediscover a path is received. For example, a user may operate EMS 104 to request that one or more paths be discovered or received. The request may indicate one or more specific timeslots for the path. Alternatively, the request may indicate a side of a node, such as the east side, a particular node, or a subset of nodes, such as a ring of nodes, or all rings managed by EMS 104.

The request may be in response to a network failure or when information in network configuration database 202 has become corrupted. The request may be manually entered or automatically generated in response to a network failure.

In stage 402, EMS 104 responds to the request and searches for a first boundary for each path. For example, EMS 104 may command communications module 204 to collect information from nodes 108, 110, and 112. The information indicates the paths that have been provisioned in network 106. Nodes 108, 110, and 112 may provide this information from their local memory, such as local memory 306 in node 108, in the form of XML data. Communications module 204 may then pass this information to network management application 200. Network management application 200 may also use information from network configuration database 202, such as the corresponding path object for each path in the request.

Network management application 200 parses this information to identify the boundaries that have been provisioned in network 106. In particular, network management application 200 may identify how each timeslot is configured within a node. For SONET-type networks, network management application 200 may assume that a timeslot is configured as either a pass-through cross-connect or as a boundary, such as an add drop cross-connect. A pass-through cross-connect timeslot passes data from one side of a node, such as node 108, to another side. A boundary, such as an add-drop cross-connect, serves as one end of a path in network 106. Network management application 200 may identify a boundary for a path based on where data is added or dropped. For example, as shown in FIG. 3B, in node 108, a boundary on a path exists on timeslot 10 on both the east and west sides.

In stage 404, network management application 200 determines whether it has found a first boundary. If the first boundary has not yet been found, network management application 200 repeats processing at stage 402 to continue searching. When conducting this search, network management application 200 may query all or part of each node. For example, network management application 200 may search through each timeslot of one or both sides of node. Alternatively, network management application 200 may trace through one or more timeslots through each node of network 106 until it finds a boundary.

Network management application 200 may rely on various algorithms to determine whether to search through all or part of a node. For example, network management application 200 may search through all or part of a node based on the protection scheme for a path. In addition, network management application 200 may assume that a path is configured on the same timeslot of each node that it traverses. For example, as shown in FIG. 3B, node 108 cross-connects data for a path through timeslots 46-48. Network management application 200 may therefore assume that this path continues through the other nodes on the same timeslots, i.e., timeslots 46-48.

If a first boundary has been found, processing by network management application 200 then proceeds to stage 406. In stage 406, network management application 200 searches for the second boundary of each path. The search for the second boundary is similar to the search above for the first boundary. However, network management application 200 may narrow its search for the second boundary based on the information learned from the previous search for the first boundary.

For example, as shown in FIG. 3B, network management application 200 may find a boundary at timeslot 10 on the east side of node 108. When searching for the second boundary, network management application 200 may limit its search to timeslot 10 on the other nodes or may limit its search to the west side of the other nodes.

In stage 408, network management application 200 determines whether it has found a second boundary. As noted, for SONET-type networks, network management application 200 may identify the second boundary based on when a timeslot is configured as an add/drop. If the second boundary of a path is not found, then network management application 200 repeats processing at stage 406. If second boundary of a path is found, then network application 200 proceeds to stage 410.

In stage 410, network management application 200 creates or modifies a path object for the path. In particular, network management application 200 may write or update data to network configuration database 202. The path object may be configured as a table or object-oriented object. The path object may be written to indicate each node that the path traverses, its protection scheme, and its boundaries.

In addition, network management application 200 may provide a notification to the user. For example, network management application 200 may update information on a display or map of network 106. One example of such displays is provided in FIGS. 6-7.

Figure 5:
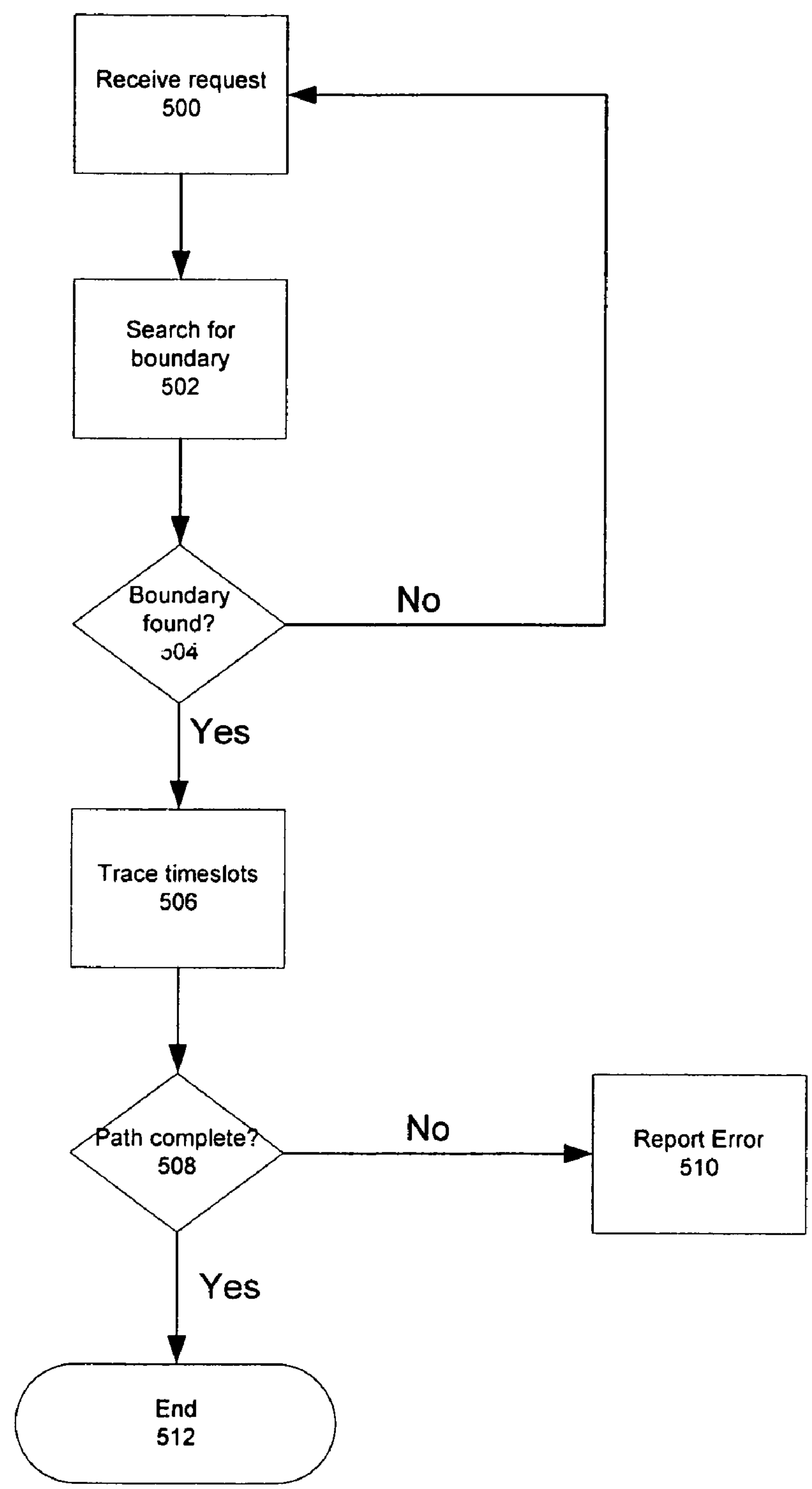
FIG. 5 illustrates an exemplary process flow to repair a path in the network in accordance with the principles of the present invention.

FIG. 5 illustrates an exemplary process flow to repair a path in the network in accordance with the principles of the present invention. In stage 500, a request to repair a path is received. For example, a user may operate EMS 104 to request that one or more paths be repaired. For example, a path may require repair due to a network failure or due to a configuration error in network 106. The request may indicate one or more specific timeslots for the path. Alternatively, the request may indicate a side of a node, such as the east side, a particular node, or a subset of nodes, such as a ring of nodes.

In stage 502, EMS 104 responds to the request and searches for a first boundary for each path. For example, EMS 104 may command communications module 204 to collect information from nodes 108, 110, and 112. The information indicates the paths that have been provisioned in network 106. Nodes 108, 110, and 112 may provide this information from their local memory, such as local memory 306 in node 108, in the form of XML data. Communications module 204 may then pass this information to network management application 200. Network management application 200 may also use information from network configuration database 202, such as the corresponding path object for each path in the request.

Network management application 200 parses this information to identify the boundaries that have been provisioned in network 106. For SONET-type networks, network management application 200 may assume that a timeslot is configured as either a pass-through cross-connect or as a boundary.

In stage 504, network management application 200 determines whether it has found a first boundary. If the first boundary has not yet been found, network management application 200 repeats processing at stage 402 to continue searching. When conducting this search, network management application 200 may query all or part of each node. For example, network management application 200 may search through each timeslot of one or both sides of node. Alternatively, network management application 200 may trace through one or more timeslots through each node of network 106 until it finds a boundary.

Network management application 200 may rely on various algorithms to determine whether to search through all or part of a node. For example, network management application 200 may search through all or part of a node based on the protection scheme for a path. In addition, network management application 200 may assume that a path is configured on the same timeslot of each node that it traverses. For example, as shown in FIG. 3B, node 108 cross-connects data for a path through timeslots 46-48. If network management application 200 is attempting to repair this path, then it may therefore assume that this path continues through the other nodes on the same timeslots, i.e., timeslots 46-48.

If a first boundary has been found, processing by network management application 200 then proceeds to stage 506. In stage 506, network management application 200 traces the path through network 106. For example, network management application 200 may identify the node in which the path has a boundary. Network management application 200 may determine the next neighboring node to that boundary node. For example, a path on timeslot 10 may have a boundary on the east side of node 108. Network management application 200 may therefore proceed to the east of node 108, i.e., the west side of node 110.

The search for the second boundary is similar to the search above for the first boundary. However, network management application 200 may narrow its search for the second boundary based on the information learned from the previous search for the first boundary. For example, when tracing through a path, network management application 200 may limit its search to timeslot 10 on the other nodes or may limit its search to the west side of the other nodes. Of course, network management application 200 may also recognize when a node supports timeslot interchange.

In stage 508, network management application 200 determines whether a path is correctly provisioned. For SONET-type networks, network management application 200 may determine whether a path is correctly provisioned by assuming that a path includes at least one pair of boundaries and a contiguous set of cross-connects between the boundaries. For example, as shown in FIG. 1, a path for terminal devices 102 may have boundaries on nodes 108 and 112 on timeslot 10. Accordingly, network management application 200 may then check to ensure that node 110 has a cross connect configured on timeslot 10 to support this path.

Network management 200 may also determine if a path is correctly provisioned based on other criteria. For example, network management 200 may determine that a path is incomplete based on failing to find one of the boundaries of a path or that a path fails to meet some protection scheme criteria etc.

If a path is incorrectly provisioned, then network application 200 proceeds to stage 510. In stage 510, network application 200 may report an error to the user. The error report may identify the specific path that is incorrectly provisioned and its corresponding path object. In addition, the error report may identify a specific node that is incorrectly provisioned. Other information may also be included in the error report, such as a recommended course of action to repair the path. Alternatively, network application 200 may attempt an automatic repair of missing cross-connect elements that it finds.

If a path is correctly provisioned, then network management application 200 ends processing at stage 512. In addition, network management application 200 may report to the user that a path is correctly provisioned or that it found no errors.

Figure 6:
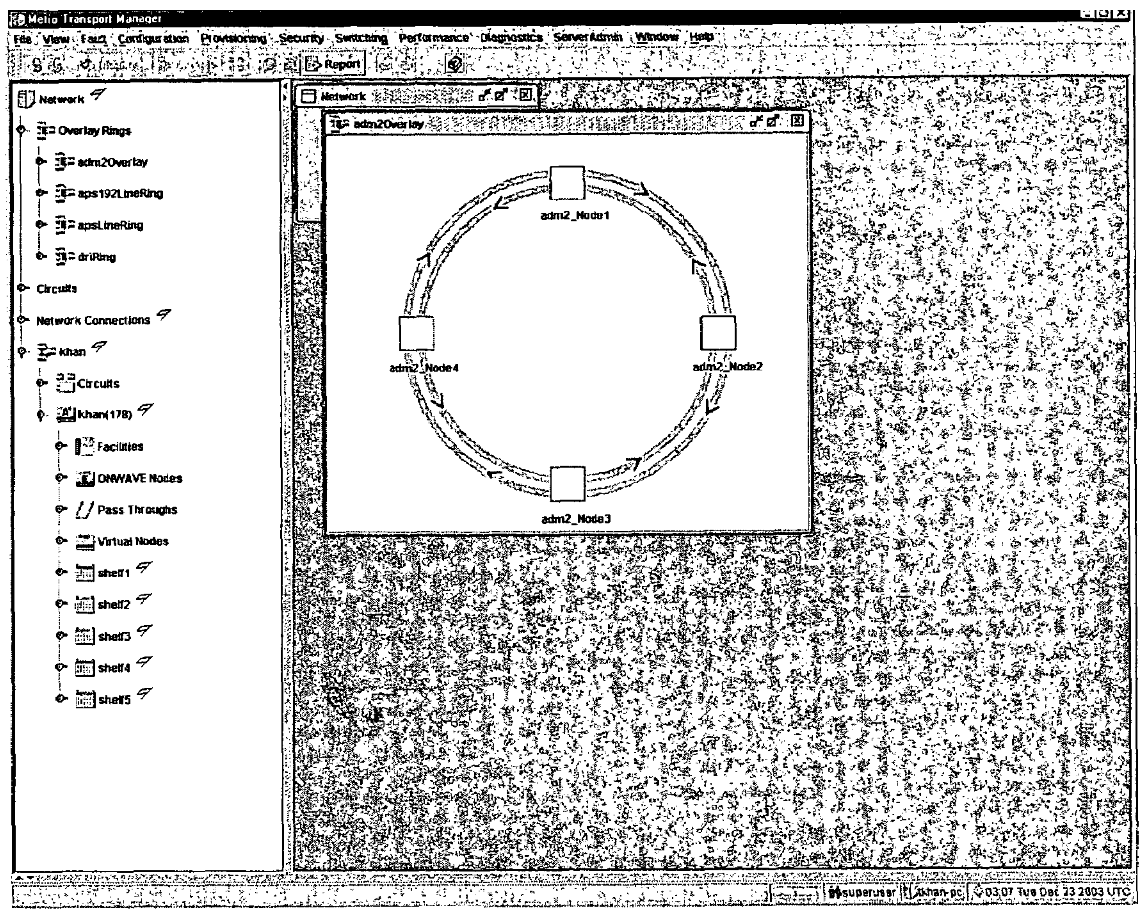
FIG. 6 illustrates one example of a display to indicate the topology of a network in accordance with the principles of the present invention.
Figure 7:
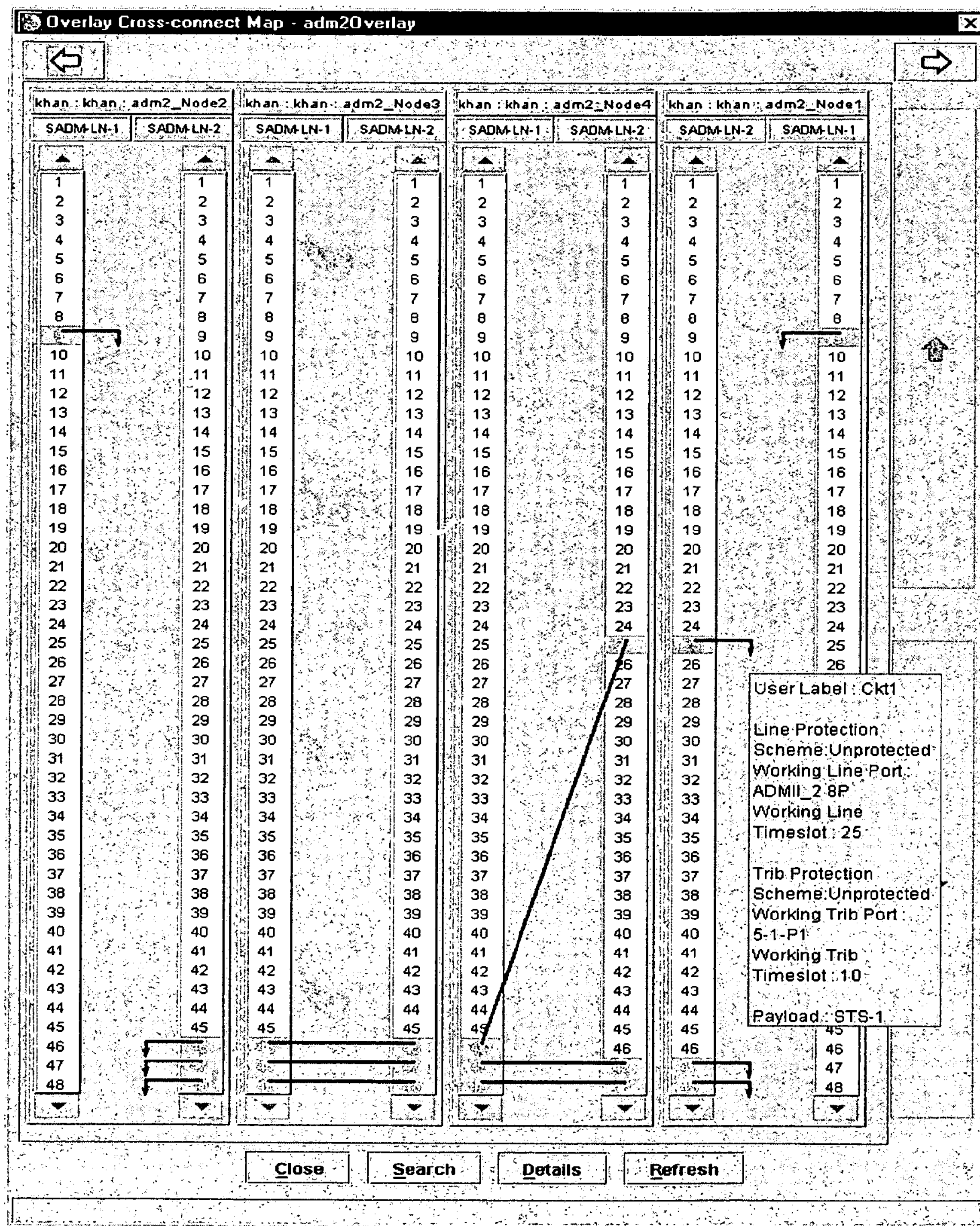
FIG. 7 illustrates one example of a display to indicate the provisioning of one or more nodes in a network in accordance with the principles of the present invention.

FIGS. 6 and 7 are examples of displays that may be provided by EMS 104. In particular, FIG. 6 illustrates one example of a display that indicates the topology of a network. FIG. 7 illustrates one example of a display that indicates the provisioning of one or more nodes in a network. Such displays may be useful, for example, to a user to determine when a path has been rediscovered or determine how to repair a path.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for identifying a path that has been provisioned in a communications network, the network having a plurality of nodes that are connected to each other through links that carry time division multiplexed signals divided into a set of predetermined timeslots, said method comprising:

receiving a request to identify a path that has been provisioned in the network, wherein the request is responsive to a fault condition comprising corruption of a network configuration database, and wherein the path that has been provisioned in the network comprises data transmitted utilizing a protocol between one or more terminal devices;

retrieving information from nodes in the network that indicate a respective configuration of the predetermined timeslots;

identifying at least one pair of boundaries of the path based on the configuration of the predetermined timeslots, wherein identifying at least one pair of boundaries of the path based on the configuration of the predetermined timeslots comprises determining whether a timeslot is configured as a pass-through cross-connect or an add/drop, and wherein the identifying the least one pair of boundaries is performed by conducting a query of all or part of each node in the communications network for a first boundary, tracing the predetermined timeslots from the first boundary through one or more nodes in the network, and conducting a narrowed query of all or part of each node in the communications network for a second boundary, wherein the narrowed query is narrowed responsive to the results of the query for the first boundary;

determining a list of nodes comprising each of the nodes in the path and a list of which of the set of determined timeslots the path utilizes at each of the nodes in the path; and performing one of creating and modifying a path object for the path in the network configuration database responsive to the identifying and determining steps;

wherein the method is executed on an element management system associated with a SONET/SDH network to reconcile circuit data between a database associated with the element management system and provisioning information of each of the plurality of nodes.

2. The method of claim 1, wherein receiving the request includes receiving information that indicates at least one timeslot of the set of predetermined timeslots.

3. The method of claim 1, wherein receiving the request includes receiving information that indicates one of one side of the nodes in the path and a node in the path.

4. The method of claim 1, wherein the identifying step determines whether to query of all or part of each node based on one of a protection scheme, assuming the path continues through other nodes on the same predetermined timeslots, and checking all timeslots if the first boundary is not identified.

5. The method of claim 1, wherein receiving the request includes receiving information that identifies a set of nodes in the network.

6. The method of claim 1, wherein receiving the request includes receiving information that identifies a ring of nodes in the network.

7. The method of claim 1, wherein receiving the request includes receiving information that identifies a plurality of rings managed by an element management server.

8. An apparatus for identifying a path that has been provisioned in a communications network, the network having a plurality of nodes that are connected to each other through links that carry signals divided into a set of predetermined timeslots, said apparatus comprising:

an element management system associated with the communications network, wherein the communications network comprises a SONET/SDH network;

means for receiving a request to identify a path that has been provisioned in the network, wherein the request is responsive to a fault condition comprising corruption of a network configuration database, and wherein the path that has been provisioned in the network comprises data transmitted utilizing a protocol between one or more terminal devices;

means for retrieving information from nodes in the network that indicate a respective configuration of the predetermined timeslots;

means for identifying at least one pair of boundaries of the path based on the configuration of the predetermined timeslots, wherein the means for identifying at least one pair of boundaries of the path based on the configuration of the predetermined timeslots comprise means for determining whether a timeslot is configured as a pass-through cross-connect or an add/drop, wherein the means for identifying is performed by conducting a query of all or part of each node in the communications network for a first boundary, tracing the predetermined timeslots from the first boundary through one or more nodes in the network, and conducting a narrowed query of all or part of each node in the communications network for a second boundary, wherein the narrowed query is narrowed responsive to the results of the query for the first boundary;

means for determining a list of nodes comprising each of the nodes in the path and a list of which of the set of determined timeslots the path utilizes at each of the nodes in the path; and means for performing one of creating and modifying a path object for the path in the network configuration database responsive to the means for identifying and determining;

wherein identifying the path is utilized to reconcile circuit data between a database associated with the element management system and provisioning information of each of the plurality of nodes.

9. A system that identifies a path that has been provisioned in a communications network, the network having a plurality of nodes that are connected to each other through links that carry signals divided into a set of predetermined timeslots, said system comprising:

a memory that stores information indicating paths that have been provisioned in the network, wherein the paths each comprise data transmitted utilizing a protocol between one or more terminal devices;

an interface to retrieve information that indicates a respective configuration of the predetermined timeslots from the nodes in the network; and a processor configured by program code that identifies at least one pair of boundaries of a selected path based on the configuration of the predetermined timeslots of the nodes in the network and updates the information for the selected path that is stored in the memory, wherein identifying at least one pair of boundaries of the selected path based on the configuration of the predetermined timeslots of the nodes in the network comprises determining whether a timeslot is configured as a pass-through cross-connect or an add/drop, wherein the at least one pair of boundaries of the selected path is identified responsive to one of a fault condition and a network database corruption, and wherein the updated information for the selected path comprises a list of nodes comprising each of the nodes in the selected path and a list of which of the set of determined timeslots the path utilizes at each of the nodes in the selected path, wherein the identifying the least one pair of boundaries is performed by conducting a query of all or part of each node in the communications network for a first boundary, tracing the predetermined timeslots from the first boundary through one or more nodes in the network, and conducting a narrowed query of all or part of each node in the communications network for a second boundary, wherein the narrowed query is narrowed responsive to the results of the query for the first boundary;

wherein the processor is further configured to perform one of creating and modifying a path object for the path in the network configuration database responsive to the updated information; and wherein the system comprises an element management system associated with a SONET/SDH network to reconcile circuit data between a database associated with the element management system and provisioning information of each of the plurality of nodes.

10. The system of claim 9, wherein the memory stores information that indicates a protection scheme for each path that has been provisioned in the network, and wherein the identifying step determines whether to query of all or part of each node based on one of a protection scheme, assuming the path continues through other nodes on the same predetermined timeslots, and checking all timeslots if the first boundary is not identified.

11. The system of claim 9, wherein the processor is configured by program code to identify at least one additional pair of boundaries of the selected path based on a stored protection scheme for the selected path.

12. A method of identifying a repair for a path that has been provisioned in a communications network, the network having a plurality of nodes that are connected to each other through links that carry signals divided into a set of predetermined timeslots, said method comprising:

receiving a request to repair a path that has been provisioned in the network, wherein the request is responsive to a fault condition comprising corruption of a network configuration database, and wherein the path that has been provisioned in the network comprises data transmitted utilizing a protocol between one or more terminal devices;

retrieving information from nodes in the network that indicate a respective configuration of the predetermined timeslots;

identifying a first boundary of the path based on the configuration of the predetermined timeslots, wherein the identifying the first boundary is performed by conducting a query of all or part of each node in the communications network;

tracing the path from the first boundary through nodes in the network based on the configurations of the predetermined timeslots, wherein tracing comprises determining a list of nodes comprising each of the nodes in the path and a list of which of the set of determined timeslots the path utilizes at each of the nodes in the path;

determining whether the path ends at a second boundary based on the configurations of the predetermined timeslots and by identifying the second boundary by conducting a second query of all or part of each node in the communications network narrowing the second query responsive to the results of the query for the first boundary; and performing one of creating and modifying a path object for the path in the network configuration database responsive to the identifying, tracing, and determining steps;

wherein the method is executed on an element management system associated with a SONET/SDH network to reconcile circuit data between a database associated with the element management system and provisioning information of each of the plurality of nodes.

13. The method of claim 12, further comprising reporting an error when the path is incorrectly provisioned and automatically repairing missing cross-connect elements found for the path.

14. The method of claim 12, further comprising provisioning a cross-connect at locations along the path having a missing cross-connect element.

15. The method of claim 12, wherein receiving the request includes receiving information that indicates at least one timeslot of the set of predetermined timeslots.

16. The method of claim 12, wherein receiving the request includes receiving information that indicates one of one side of the nodes in the path and a node in the path.

17. The method of claim 12, wherein the identifying step determines whether to query of all or part of each node based on one of a protection scheme, assuming the path continues through other nodes on the same predetermined timeslots, and checking all timeslots if the first boundary is not identified.

18. The method of claim 12, wherein receiving the request includes receiving information that indicates a set of nodes in the network.

19. The method of claim 12, wherein receiving the request includes receiving information that identifies a ring of nodes in the network.

20. The method of claim 12, wherein receiving the request includes receiving information that identifies a plurality of rings in the network that are managed by a server.

21. An apparatus for identifying a repair for a path that has been provisioned in a communications network, the network having a plurality of nodes that are connected to each other through links that carry signals divided into a set of predetermined timeslots, said apparatus comprising:

an element management system associated with the communications network, wherein the communications network comprises a SONET/SDH network;

means for receiving a request to repair a path that has been provisioned in the network, wherein the path comprises data transmitted utilizing a protocol between one or more terminal devices;

means for retrieving information from nodes in the network that indicate a respective configuration of the predetermined timeslots;

means for identifying a first boundary of the path based on the configuration of the predetermined timeslots, wherein the means for identifying the first boundary of the path based on the configuration of the predetermined timeslots comprise means for determining whether a timeslot is configured as a pass-through cross-connect or an add/drop, wherein the first boundary of the path is identified responsive to one of a fault condition and a network database corruption, and wherein the means for identifying the first boundary is performed by conducting a query of all or part of each node in the communications network;

means for tracing the path from the first boundary through nodes in the network based on the configurations of the predetermined timeslots to determine a list of nodes comprising each of the nodes in the path and a list of which of the set of determined timeslots the path utilizes at each of the nodes in the path;

means for determining whether the path ends at a second boundary based on the configurations of the predetermined timeslots, wherein the second boundary is determined by conducting a second query of all or part of each node in the communications network narrowing the second query responsive to the results of the query for the first boundary; and means for performing one of creating and modifying a path object for the path in the network configuration database responsive to the means for identifying, tracing, and determining;

wherein identifying the repair is utilized to reconcile circuit data between a database associated with the element management system and provisioning information of each of the plurality of nodes.

22. The apparatus of claim 21, further comprising means for reporting an error when an error has been found in the path.

23. The apparatus of claim 22, further comprising means for correcting the error in the path based on a request by a user.

24. The apparatus of claim 22, further comprising means for automatically correcting the error in the path based on provisioning a cross-connect at a location of the error.

25. A system that identifies a repair for a path that has been provisioned in a communications network, the network having a plurality of nodes that are connected to each other through links that carry signals divided into a set of predetermined timeslots, said method comprising:

a memory that stores information indicating paths that have been provisioned in the network, wherein the paths each comprise data transmitted utilizing a protocol between one or more terminal devices;

an interface to retrieve information from nodes in the network that indicate a respective configuration of the predetermined timeslots; and a processor configured by program code to identify a first boundary of a path based on the configuration of the predetermined timeslots, trace the path from the first boundary through nodes in the network based on the configuration of the predetermined timeslots, and determine whether the path ends at a second boundary based on the configuration of the predetermined timeslots, wherein identifying the first boundary of the path based on the configuration of the predetermined timeslots of the nodes in the network comprises determining whether a timeslot is configured as a pass-through cross-connect or an add/drop, wherein the first boundary of the path is identified responsive to one of a fault condition and a network database corruption, and wherein the processor is further configured to determine a list of nodes comprising each of the nodes in the path and a list of which of the set of determined timeslots the path utilizes at each of the nodes in the path, wherein the identifying the first boundary is performed by conducting a query of all or part of each node in the communications network for the first boundary, and conducting a narrowed query of all or part of each node in the communications network for a second boundary, wherein the narrowed query is narrowed responsive to the results of the query for the first boundary;

wherein the processor is further configured to perform one of creating and modifying a path object for the path in the network configuration database; and wherein the system comprises an element management system associated with a SONET/SDH network to reconcile circuit data between a database associated with the element management system and provisioning information of each of the plurality of nodes.

26. The system of claim 25, wherein the memory stores information that indicates a protection scheme for each path that has been provisioned in the network.

27. The system of claim 26, wherein the processor is configured by program code to identify at least one additional pair of boundaries of the path based on a stored protection scheme for the path.

28. The system of claim 26, wherein the processor is configured by program code to notify a user when an error has been found in the path.

29. The system of claim 28, wherein the processor is configured by program code to correct the error based on input from the user.

30. The system of claim 28, wherein the processor is configured by program code to automatically correct the error based on provisioning a cross-connect at a location of the error.

* * * * *